(12) United States Patent
Nakano

(10) Patent No.: US 6,575,373 B1
(45) Date of Patent: Jun. 10, 2003

(54) SECURITY CARD AND A COMPUTER SYSTEM PROVIDED WITH AN INTERFACE FOR READING A SECURITY CARD

(75) Inventor: Hiroo Nakano, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 83 days.

(21) Appl. No.: 09/662,864

(22) Filed: Sep. 15, 2000

(30) Foreign Application Priority Data

Sep. 17, 1999 (JP) ............................................. 11-264537

(51) Int. Cl.⁷ .............................................. G06K 19/06
(52) U.S. Cl. ........................ 235/492; 235/380; 235/382; 235/487
(58) Field of Search ................................ 235/380, 487, 235/492, 382; 380/25

(56) References Cited

U.S. PATENT DOCUMENTS

| | | | | |
|---|---|---|---|---|
| 5,406,624 A | * | 4/1995 | Tulpan | 235/380 |
| 5,852,290 A | * | 12/1998 | Chaney | 235/380 |
| 5,936,543 A | | 8/1999 | Matsumoto | |
| 6,010,074 A | * | 1/2000 | Kelly et al. | 235/492 |
| 6,098,888 A | * | 8/2000 | Praden | 235/492 |
| 6,196,459 B1 | * | 3/2001 | Goman et al. | 235/380 |
| 6,296,191 B1 | * | 10/2001 | Hamann et al. | 235/487 |
| 6,402,028 B1 | * | 6/2002 | Graham et al. | 235/380 |

FOREIGN PATENT DOCUMENTS

JP 8-249239 9/1996

* cited by examiner

*Primary Examiner*—Michael G. Lee
*Assistant Examiner*—Steven S. Paik
(74) *Attorney, Agent, or Firm*—Oblon, Spivak, McClelland, Maier & Neustadt, P.C.

(57) ABSTRACT

A security card 20 including a CPU 1 for executing instruction sequences such as a password verifying routine, a memory 2 configured to store secret data such as the password and so forth, a random signal generation circuit 4 configured to generate a wait signal which is output in order to halt the operation of the CPU 1. When the wait signal is input, the CPU 1 halts its operation for a short time such as one to several clocks. In accordance with the security card 20, the operation of the CPU 1 can be deferred for a short time in an arbitrary timing in order to make it difficult to analyze the operation of the CPU 1.

18 Claims, 7 Drawing Sheets

SECURITY CARD AND A COMPUTER SYSTEM PROVIDED WITH AN INTERFACE FOR READING A SECURITY CARD

CROSS REFERENCE TO THE RELATED APPLICATION

The subject application is related to subject matter disclosed in the Japanese Patent Application No.Hei11-264537 filed in Sep. 17, 1999 in Japan, to which the subject application claims priority under the Paris Convention and which is incorporated by reference herein.

BACKGROUND OF THE INVENTION

1. Field of the Invention

The present invention is related to a signal processing device provided with a processor (CPU), a memory and so forth. In particular, the present invention is related to a signal processing device installed within a security equipment, an encryption device such as an IC card (smart card), an electronic lock and so forth.

2. Description of the Related Art

In the prior art technique, a security equipment such as an encryption device installed within an IC card (smart card), an electronic lock and so forth is provided generally with a signal processing device having a CPU, a memory and so forth for the verification of a password.

The instruction execution cycle times as required for executing the respective instructions by means of the signal processing device are different from each other depending upon the execution types thereof. Accordingly, a respective instruction is executed at a predetermined time point after the signal processing device initiates instruction processing so that it is possible to analyze the operation of the signal processing device relating to the timing of the execution of a particular instruction, for example, by monitoring the time elapsed just after initiating a certain stage of the instruction processing triggered by resetting the internal CPU or receiving an external signal.

Because of this, for example, it becomes possible to determine a particular instruction a predetermined time period after initiating a certain stage of instruction processing by monitoring an internal phenomenon which can be externally observed. Hence, there is a fear that the operation of the signal processing device is analyzed by an unauthorized person.

Accordingly, pseudo routines, which are useless and harmless, are inserted into the program routine executed by the signal processing device, as means for introducing irregularity to the sequence of instructions as executed in order to deceive the analysis of the operation of the signal processing device.

More specifically speaking, for example, the program routine including the pseudo routine may be executed in order to run the pseudo routine between the main routine for verifying a password and the internal phenomenon which is externally observable. Particularly, the pseudo routine is repeated between the main routine and the internal phenomenon for a variable number of times, i.e., the frequency of repetition is determined at random for each appearance of the program routine.

However, in the prior art technique making use of such a pseudo routine, there is a problem that the processing time in the signal processing device tends to becomes longer. More specifically speaking, while a random variation of the order of one to several clocks in the processing time is sufficient to obfuscate the internal phenomenon under external analysis, several tens of clocks are required to run the pseudo routine from the main routine. Furthermore, there is substantial overhead on the processing time of the signal processing device when the pseudo routine is repeated for a plurality of times.

The present invention has been made in order to solve the shortcomings as described above. It is an object of the present invention therefore to provide a signal processing device with an improved reliability and an enhanced impenetrability against encryption analysis while avoiding substantial overhead on the processing time of the signal processing device.

SUMMARY OF THE INVENTION

In order to accomplish the above and other objects, when a signal input to a signal processing device is processed by a processor, a wait signal is transmitted from a random signal generation circuit to the processor in a non-periodic manner in order to halt the processor at random. The operation state of the processor is maintained when halted, and the halted operation is continued from the operation state as maintained when resumed.

In accordance with the present invention, since the operation of the processor can be halted in a non-periodic manner, it is possible to prevent the operation of the processor from being analyzed by observing the internal phenomena of the processor. Particularly, in the case of the present invention, substantial overhead on the processing time of the signal processing device can be avoided by providing a short halting time period Meanwhile, also in accordance with an modification of the present invention, the clock signal as inputted to the processor can be deferred in a non-periodic manner. In the case of the modification, it is possible to make more implicated patterns of the operation of the processor by the combination of deferring the clock signal in a non-periodic manner and the wait signal as output from the random signal generation circuit also in a non-periodic manner. As a result, the analysis of the operation of the signal processing device becomes furthermore difficult.

Also, in accordance with another modification of the present invention, the processor receives a password as said signal and matches the password against secret data stored in a memory in order to verify whether or not the password is in agreement with the secret data.

In the case of the modification, it becomes possible to make difficult the analysis of the operation by externally observing the internal operation while the processor performs signal processing for matching the password and the secret data. The reliability of the signal processing device can therefore be improved.

DETAILED DESCRIPTION OF EMBODIMENTS

First Embodiment

Configuration of the Signal Processing Device

Figure 1:
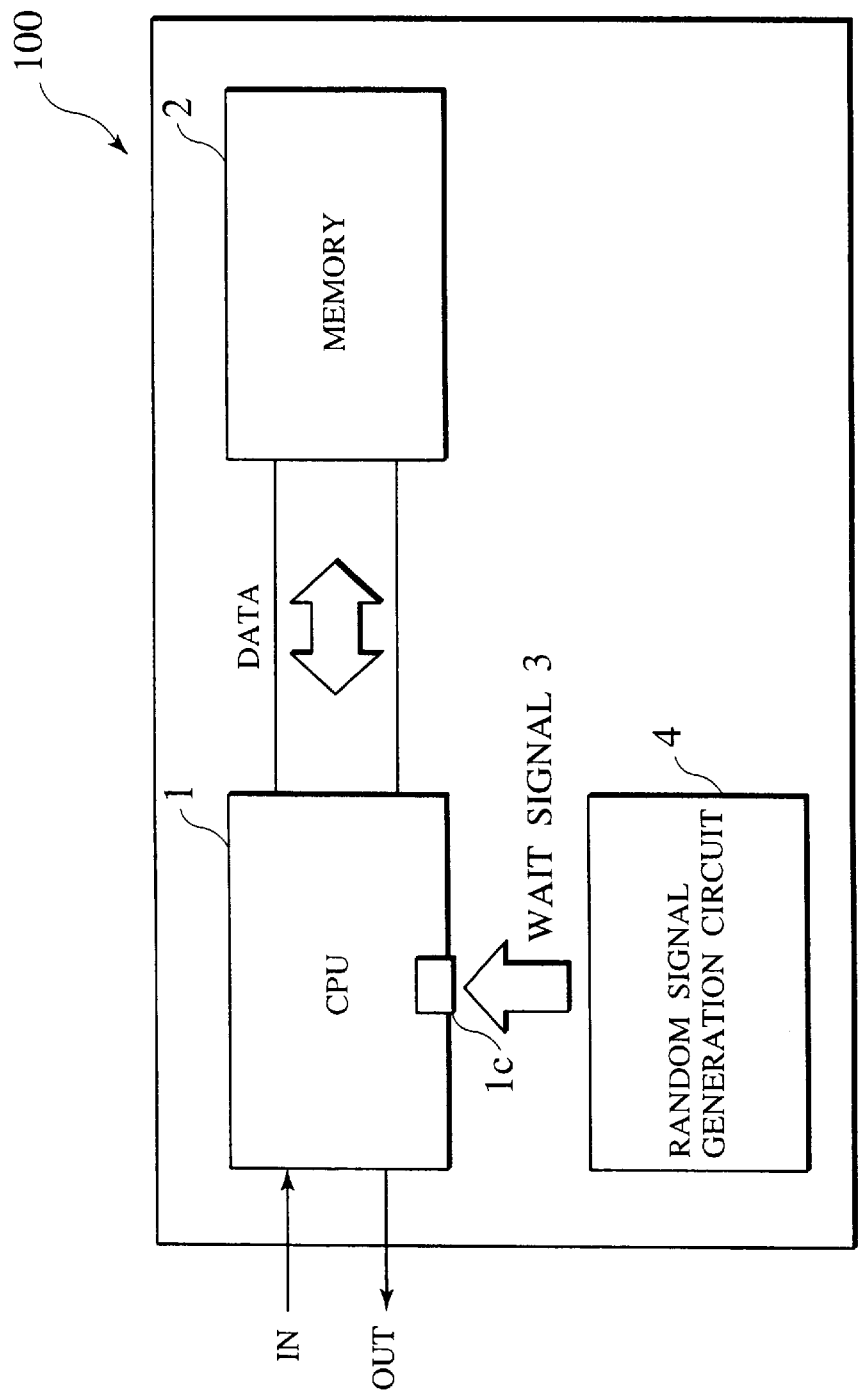
FIG. 1 is a block diagram showing the configuration of a signal processing He in accordance with a first embodiment of the present invention.

FIG. 1 is a block diagram showing the configuration of the signal processing device 100 in accordance with the first embodiment of the present invention.

As illustrated in FIG. 1, the signal processing device 100 is composed of a CPU 1 for executing instruction sequences for such as a routine of verifying a password, a memory 2 for storing secret data such as the password and so forth, a random signal generation circuit 4 for generating a wait signal 3 which is output in order to halt the operation of the CPU 1.

The CPU 1 is for example a semiconductor integrated circuit for taking control of the entirety of the signal processing device 100. When a signal indicative of a password is input to, the signal is interpretted and is matched against the secret data stored in the memory 2 by means of the CPU 1 in order to verify whether or not the password is in agreement with the secret data and output the verification result to an external device.

Particularly, the CPU 1 is provided with a wait signal input terminal 1a for receiving the wait signal 3. When the wait signal 3 is input to the signal processing device 100, the CPU 1 halts its operation for a short time such as one to several clocks.

The random signal generation circuit 4 is located beside the CPU 1. The random signal generation circuit 4 is composed of an integrated circuit such as an semiconductor device in order to output the wait signal 3 in a non-periodic manner.

Operation of the Signal Processing Device

Next, the operation of the signal processing device 100 will be explained.

First, a signal such as a password is input to the CPU 1, which serves to process the signal in order to verify the signal by comparing it to the secret data stored in the memory 2. On the other hand, the wait signal is inputted to the CPU 1 from the random signal generation circuit 4 with random intervals during processing the signal. The CPU 1 then halts its operation for a certain period, for example, for one to several clocks. The CPU 1 maintains its operation state during the halting period. After resuming the operation, the CPU 1 continues the process handled just before it halts. When the verification of the password is completed, the verification result is output from the CPU 1.

Effects of the Signal Processing Device

In accordance with the signal processing device 100, the security of the signal processing device 100 is enhanced by making use of the waiting function provided for the CPU 1. Namely, in the case of the signal processing device 100, it takes a different number of clocks for a different time of initiating a certain routine to execute a particular instruction, and therefore making it difficult to analyze the operation of the CPU 1 and improving the security of the signal processing device 100. Particularly, since the random signal generation circuit 4 in accordance with this embodiment is capable of deferring the operation of the CPU 1 only for a short time such as for one to several clocks and therefore it is no longer the case that the progress of the task of the CPU 1 is substantially delayed.

Second Embodiment

Configuration of the Signal Processing Device

Figure 2:
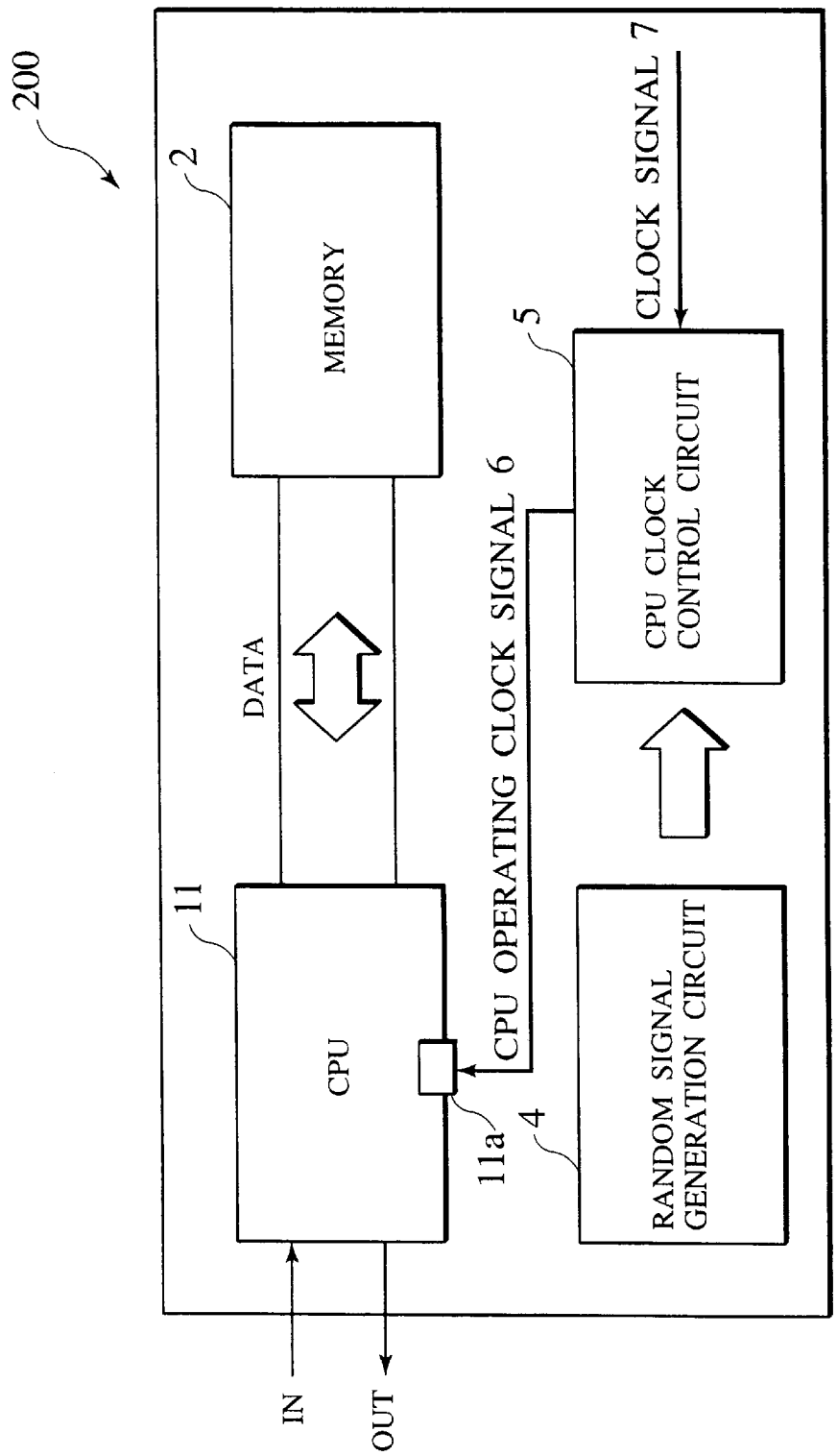
FIG. 2 is a block diagram showing the configuration of a signal processing device in accordance with a second embodiment of the present invention.

FIG. 2 is a block diagram showing the configuration of a signal processing device 200 in accordance with the second embodiment of the present invention. The first embodiment of the present invention has been described with the CPU of the signal processing device which is designed to halt the operation in response to the wait signal. However, the second embodiment is applicable to a signal processing device equipped with a CPU which is not provided with such a function.

As illustrated in FIG. 2, the signal processing device 200 is composed generally of a CPU 11 for executing instruction sequences for such as a routine of verifying a password, a memory 2 for storing secret data such as the password and so forth, a CPU clock control circuit 5 for controlling the supply of clock signals to the CPU 11, a random signal generation circuit 4 for generating a random signal 3 in order to control the operation of the CPU clock control circuit 5.

The CPU 11 is not provided with the halt function responsive to the wait signal unlike the CPU 1 of the first embodiment. The CPU 11 is provided with a CPU operating clock signal input terminal 11a through which CPU operating clock signal 6 is inputted to the CPU 11. The CPU 11 is controllably operated with the CPU operating clock signal 6 as input from the CPU operating clock signal input terminal 11a.

When the CPU 11 is suspended from being supplied with the CPU operating clock signal 6, the operation of the CPU 11 is halted with its internal operation state thereof being maintained as it is. When the CPU operating clock signal 6 is supplied again to the CPU 11, the CPU 11 resumes its operation from the internal operation state as maintained.

The CPU clock control circuit 5 serves to control the supply of the CPU operating clock signal the CPU 11. Namely, the CPU clock control circuit 5 serves to intercept the clock signal 7 to be supplied to the CPU 11 and transfer the clock signal 7 to the clock signal input terminal 11a of the CPU 11 as the CPU operating clock signal 6 under the control of the random signal from the random signal generation circuit 4.

The random signal generation circuit 4 serves to supply the wait signal 3 to the CPU clock control circuit 5 in a non-periodic manner. The random signal generation circuit 4 serves to make irregular the frequency of the CPU operating clock signal 6 as outputted from the CPU clock control circuit 5 by inputting the wait signal to the CPU clock control circuit 5 in a random timing.

Operation of the Signal Processing Device

Next, the operation of the signal processing device 200 will be explained.

First, a signal indicative of a password and the like is input to the CPU 11, which serves to process the signal in order to verify the signal by comparing it to the secret data stored in the memory 2. On the other hand, the wait signal is inputted to the CPU 11 from the random signal generation circuit 4 with random intervals in order to defer the CPU operating clock signal 6 in a non-periodic manner during processing the signal. The CPU 11 then halts its operation when deferring the supply of the CPU operating clock signal 6. The CPU 11 maintains its operation state having been taken just before it halts.

After resuming the supply of the CPU operating clock signal 6, the CPU 11 resumes and continues the halted task from the operation state having been maintained just before it halts. The irregular delay intermittently takes place during signal processing for handling a password by the signal processing device.

After completion of the verification of the password by means of the CPU 11, the verification result is outputted from the CPU 11.

Effects of the Signal Processing Device

In accordance with the signal processing device 200, since the clock signal supplied to the CPU 11 is intermittently deferred by means of the CPU clock control circuit 5 in a non-periodic manner, the timing of the execution of a particular instruction can be modified at random for each running of the program routine. For this reason, it becomes difficult to analyze the operation of the CPU 11 and improving the security of the signal processing device 200. Particularly, since the random signal generation circuit 4 in accordance with this embodiment is capable of deferring the operation of the CPU 11 only for a short time such as for one to several clocks and therefore it is no longer the case that the progress of the task of the signal processing device 200 is substantially delayed.

Third Embodiment

Figure 3:
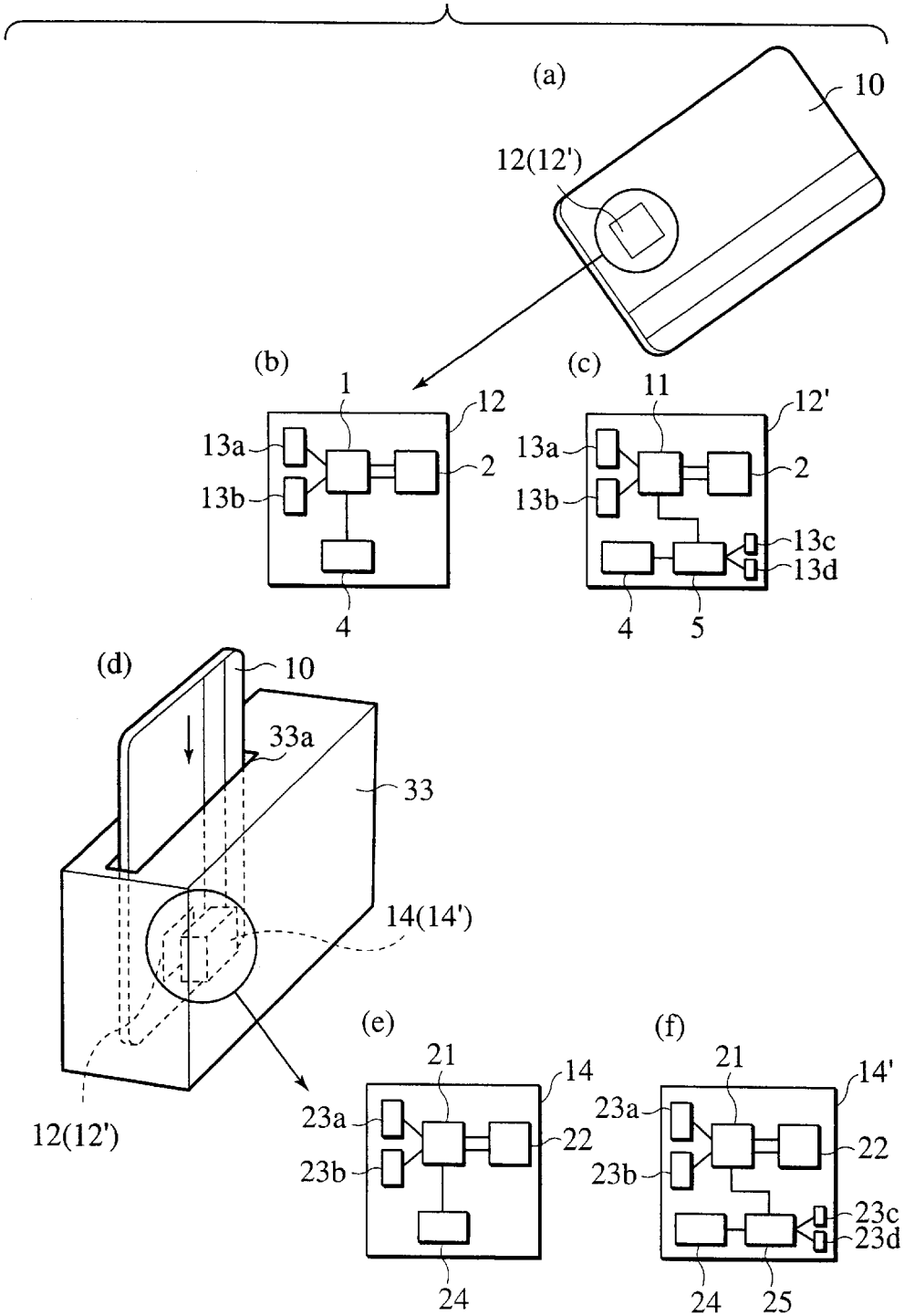
FIG. 3 is an explanatory overview of a security card in accordance with the third embodiment; in which (a) is a top view of the security card; (b) is an expanded view of an IC chip; (c) is an exemplary modification of the IC chip; and (d) is an external view showing a verification device.

FIG. 3 is a view for explaining a third embodiment of the present invention. FIG. 3(a) is a general overview of a security card 10 in accordance with the third embodiment. FIG. 3(a) and FIG. 3(b) are block diagrams showing the internal structure of an IC chip provided within the security card 10. FIG. 3(d) is a general overview of a verification device 13 of the security card 10. FIG. 3(e) and FIG. 3(f) are block diagrams showing verification circuits each of which is embedded in the verification device 13.

Configuration of the Security Card

The security card 10 is provided for use in the verification of the ID of an individual person and so forth. The security card 10 is a card made of a plastic or the like and equipped with a built-in IC chip 12 as illustrated in FIG. 3(a).

The IC chip 12 is composed of a CPU 1 for executing instruction sequences for such as a routine of verifying secret data and a memory 2 in which the ID of the owner of the security card 10 and a random signal generation circuit 4 for generating a wait signal 3 with random intervals. Also, the CPU 1 is connected to connection terminals 13a and 13b for receiving external signals.

The CPU 1 is an integrated circuit provided for taking control of the entirety of the IC chip 12. The CPU 1 is provided with a wait signal input terminal 1a for receiving the wait signal. When the wait signal is input, the CPU 1 halts its operation for a short time such as one to several clocks.

The random signal generation circuit 4 is composed of an integrated circuit such as an semiconductor device in order to output the wait signal 3 in a non-periodic manner.

Operation of the Security Card

Next, the operation of the security card 10 will be explained.

First, a command signal is input to the CPU 1 through the connection terminals 13a and 13b. The CPU 1 then interprets the command signal and, if the command signal is valid, the ID stored in the memory 2 is transmitted to the verification device 33.

On the other hand, the wait signal is inputted to the CPU 1 from the random signal generation circuit 4 with random intervals during processing the signal. The CPU 1 then halts its operation for a certain period, for example, for one to several clocks.

The CPU 1 maintains its operation state during the halting period. After resuming the operation, the CPU 1 resumes and continues the halted task from the operation state having been maintained just before it halts. When the verification of the command signal is completed, the verification result is output from the CPU 1.

Exemplary Modification of the Security Card

Meanwhile, the IC chip 12 can be replaced by an IC chip 12' which is modified as illustrated in FIG. 3(c).

The IC chip 12' is composed of a CPU 11 for executing instruction sequences for such as a routine for verification and the like, a memory 2 for storing an ID, a CPU clock control circuit 5 for controlling the supply of clock signals to the CPU 11, a random signal generation circuit 4 for generating a random signal 3 in order to control the operation of the CPU clock control circuit 5.

The CPU 11 is not provided with the halt function responsive to the wait signal unlike the CPU 1 of the first embodiment. The CPU 11 is controllably operated with the the CPU operating clock signal 6.

When the CPU 11 is suspended from being supplied with the CPU operating clock signal 6, the operation of the CPU 11 is halted with its internal operation state thereof being maintained as it is. When the CPU operating clock signal 6 is supplied again to the CPU 11, the CPU 11 resumes its operation from the internal operation state as maintained.

The random signal generation circuit 4 serves to supply the wait signal to the CPU clock control circuit 5 in a non-periodic manner. The random signal generation circuit 4 serves to make irregular the frequency of the CPU operating clock signal 6 as outputted from the CPU clock control circuit 5 by inputting the wait signal to the CPU clock control circuit 5 in a random timing.

The CPU clock control circuit 5 serves to control the supply of the clock signal as input from the connection terminals 13c and 13d to the CPU 11. The CPU clock control circuit 5 serves to intercept the clock signal to be supplied to the CPU 11 and transfer the clock signal to the CPU 11 as the CPU operating clock signal 6 in a non-periodic manner under the control of the random signal from the random signal generation circuit 4.

Configuration of the Verification Device

FIG. 3(d) is an external view showing the verification device 33. The security card 10 is read out by means of the verification device 33. The verification device 33 is provided with a reading device 14 which is located in order to make contact with the connection terminals 13a and 13b for the purpose of reading the secret data stored in the memory 2. While the secret data is read out in a contact manner in accordance with this embodiment, magnetoelectric waves or infrared light can be used for the same purpose in a contactless manner.

The reading device 14 can be designed in a conventional manner as long as it is capable of reading out and analyzing signals. In particular, in accordance with this embodiment, the verification device is also provided with a circuit for functioning to prevent the encryption system from being analyzed.

Configuration of the Reading Device

FIG. 3(e) is a block diagram showing the configuration of the reading device 14 as a decryption protecting circuit. The decryption protecting circuit is composed of a CPU 21 for executing instruction sequences for such as a routine for verification and the like, a memory 22 for storing the secret data, a random signal generation circuit 24 for generating a wait signal with random intervals. Also, the CPU 21 is connected to connection terminals 23a and 23b for receiving external signals.

When the security card is to be verified, the CPU 21 serves to transmit a read command to the security card and then receives an ID transmitted from the security card as a response to the command in order to validate the ID.

Exemplary Modification of the Reading Device

Meanwhile, the reading device 14 can be replaced by a reading device 14' which is modified as illustrated in FIG. 3(c). The CPU 21 is not provided with the halt function responsive to the wait signal. The CPU 21 is controllably operated with the CPU operating clock signal as input.

When the CPU 21 is suspended from being supplied with the CPU operating clock signal, the operation of the CPU 21 is halted with its internal operation state thereof being maintained as it is. When the CPU operating clock signal is supplied again to the CPU 21, the CPU 21 resumes its operation from the internal operation state as maintained.

The random signal generation circuit 24 serves to supply the wait signal to the CPU clock control circuit 25 in a non-periodic manner. Namely, the random signal generation circuit 24 serves to make irregular the frequency of the CPU operating clock signal as outputted from the CPU clock control circuit 25 by inputting the wait signal to the CPU clock control circuit 25 in a random timing.

The CPU clock control circuit 25 serves to control the supply of the clock signal as input from the connection terminals 23c and 23d to the CPU 21. The CPU clock control circuit 25 serves to intercept the clock signal to be supplied to the CPU 21 and transfer the clock signal to the CPU 21 as the CPU operating clock signal under the control of the random signal from the random signal generation circuit 24.

Operation of the Verification Device

Next, the operation of the verification device 33 provided with the reading device 14 or 14' will be explained in the followings.

First, when the security card 10 is inserted to an insertion slot 33a of the verification device 33, command signals are exchanged between the security card 10 and the verification device 33 through the connection terminals 13a and 13b and the connection terminals 23a and 23b which are making contact with each other.

On the other hand, when the command signal is input to the security card 10 through the connection terminals 13a and 13b, the CPU 1 serves to interpret the command signal. If the command signal is valid, the ID is read out from the memory 2 and transmitted to the verification device 33.

The wait signal is inputted to the CPU 1 from the random signal generation circuit 4 with random intervals during processing the signal. The CPU 1 then halts its operation for a certain period, for example, for one to several clocks in response to the wait signal. The CPU 1 maintains its operation state during the halting period. After resuming the operation, the CPU 1 resumes and continues the halted task from the operation state having been maintained just before it halts.

The ID transmitted from the security card 10 is passed through the connection terminals 23a and 23b of the reading device 14 and verified by means of the CPU 21. Also during the process for verification, the CPU 21 intermittently halts and resumes its operation at random in response to the wait signal given from the random signal generation circuit 24.

Effects

In accordance with the security card 10 and the verification device 33 of the third embodiment of the present invention, the operation is irregularly halted and resumed in each of the security card 10 and the verification device 33 and therefore it becomes difficult to analyze the operation.

Fourth Embodiment

Configuration of the Memory Card

Figure 4A:
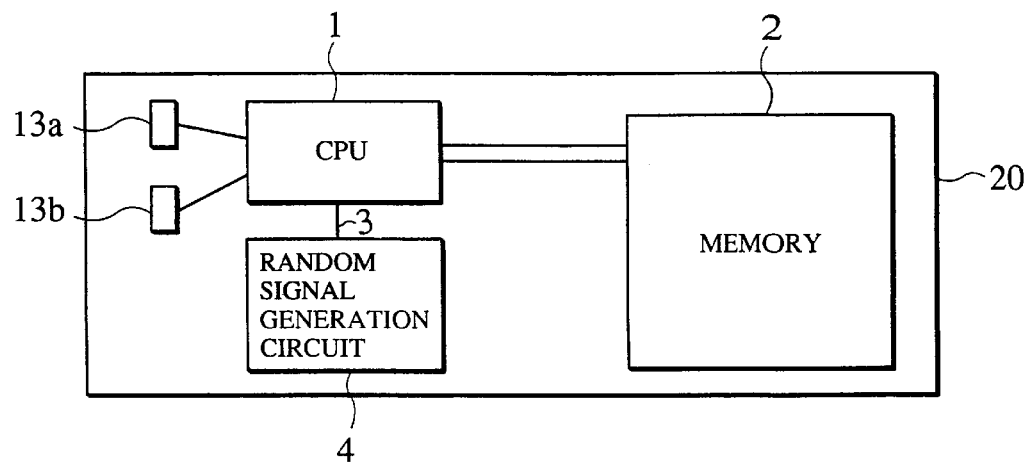
FIG. 4 is a view for explaining the configuration of a memory card in accordance with a fourth embodiment of the present invention; in which (a) is a block diagram showing the internal configuration of of the memory card; and (b) is a block dia m showing an exemplary modification of the memory card.
Figure 4B:
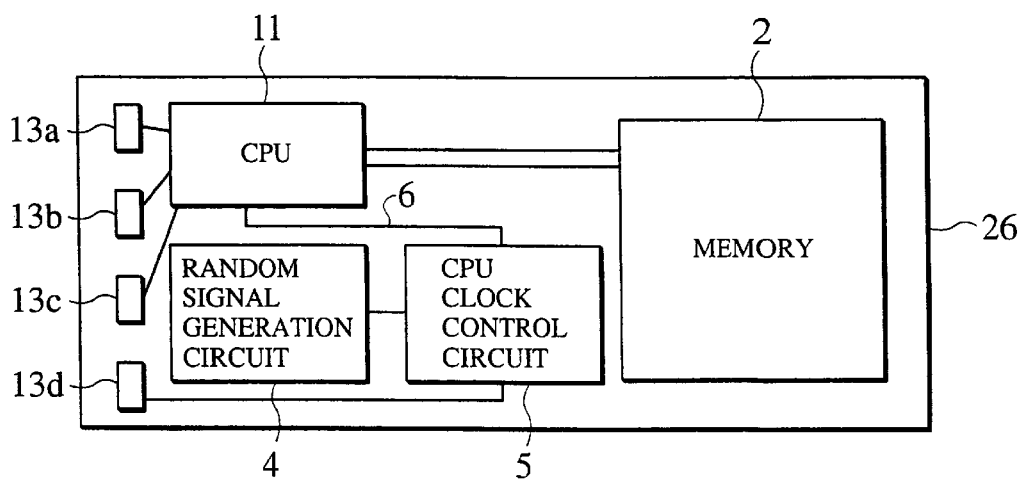

FIG. 4 is a block diagram showing the configuration of the memory card 20 for use in accordance with the fourth embodiment of the present invention. FIG. 4(b) is a block diagram showing the internal configuration of an exemplary modification of the memory card.

As illustrated in FIG. 4(a), the memory card 20 is composed of a CPU 1 for executing instruction sequences for such as a routine for verification and the like, a memory 2 for storing a start up password for use in logging in the system, a random signal generation circuit 4 for generating a wait signal 3 which is output in order to halt the operation of the CPU 1. Also, the CPU 1 is connected to connection terminals 13a and 13b for receiving external signals.

The CPU 1 is an integrated circuit provided for taking control of the entirety of the IC chip 12. When the wait signal 3 is input, the CPU 1 halts its operation for a short time such as one to several clocks.

The random signal generation circuit 4 is composed of an integrated circuit such as an semiconductor device in order to output the wait signal 3 in a non-periodic manner.

Exemplary Modification of the Memory Card

Meanwhile, the memory card can be replaced by a memory card 20' which is modified.

As illustrated in FIG. 4(b), the memory card 20' is composed of a CPU 11 for executing instruction sequences for such as a routine for verification and the like, a memory 2 for storing the start up password, a CPU clock control circuit 5 for controlling the supply of clock signals to the CPU 11, a random signal generation circuit 4 for generating a random signal in order to control the operation of the CPU clock control circuit 5.

Unlike the CPU 1, the CPU 11 is not provided with the halt function responsive to the wait signal. The CPU 11 is provided with a CPU operating clock signal input terminal 11a through which a CPU operating clock signal 6 is inputted to the CPU 11. The CPU 11 is controllably operated with the CPU operating clock signal 6 as input through the CPU operating clock signal input terminal 11a.

When the CPU 11 is suspended from being supplied with the CPU operating clock signal 6, the operation of the CPU 11 is halted with its internal operation state thereof being maintained as it is. When the CPU operating clock signal 6 is supplied again to the CPU 11; the CPU 11 resumes its operation from the internal operation state as maintained.

The CPU clock control circuit 5 serves to control the supply of the clock signal as input through the connection terminals 13c and 13d. The CPU clock control circuit 5 serves to intercept the clock signal to be supplied to the CPU 11 and transfer the clock signal as the CPU operating clock signal under the control of the random signal from the random signal generation circuit 4.

The random signal generation circuit 4 serves to supply a wait signal 3 to the CPU clock control circuit 5 in a non-periodic manner. The random signal generation circuit 4 serves to make irregular the frequency of the CPU operating clock signal 6 as outputted from the CPU clock control circuit 5 by inputting the wait signal to the CPU clock control circuit 5 in a random timing.

Verification by the Computer System

Figure 5A:
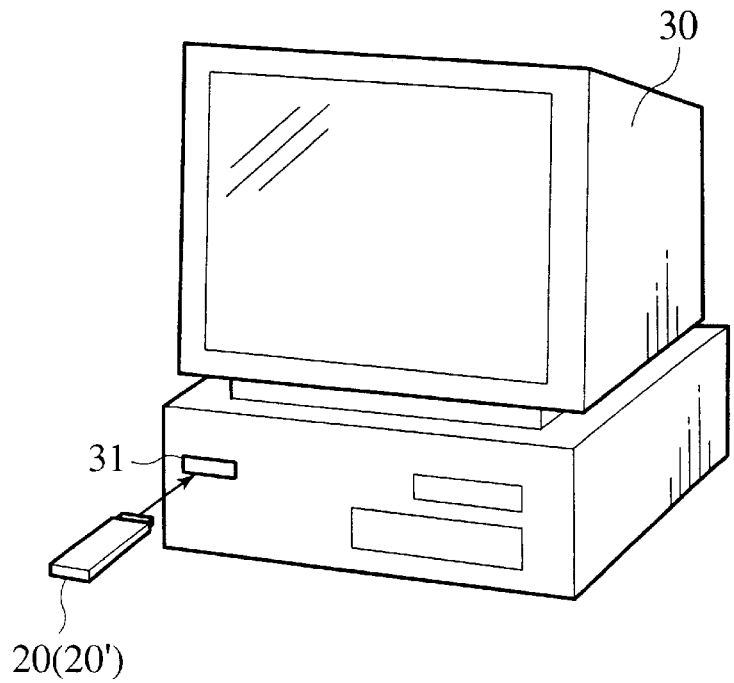
FIG. 5 is a view for explaining a computer system in accordance with the fourth embodiment of the present invention; in which (a) is an external view showing the computer system; and (b) is a schematic diagram showing the mother boar of the computer system.

Next, the verifying procedure conducted by the computer system with the memory card 20 or 20' will be explained. FIG. 5(a) is an external view showing a general purpose computer 30 such as a personal computer.

The computer system 30 is provided with a slot 31 into which the memory card 20 or 20' can be inserted.

Figure 5B:
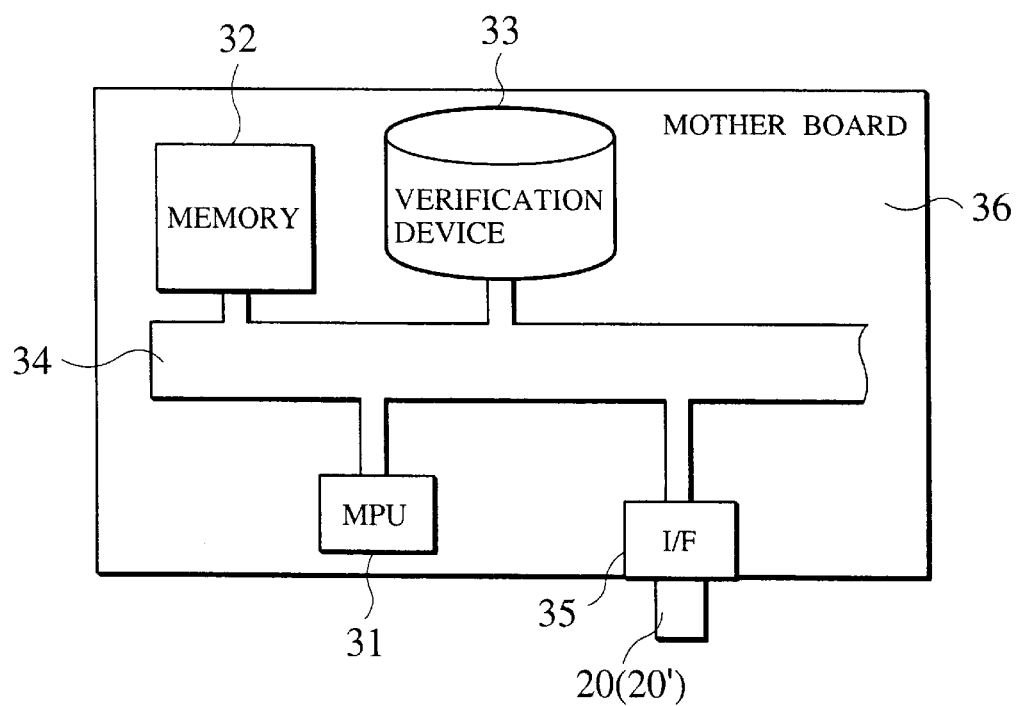

FIG. 5(b) is a block diagram showing a mother board 36 of the computer system 30. The mother board 36 is composed of a main processor unit 31, a memory 32 and a hard drive 33 which are connected to each other via a bus 34 in the same manner as in a conventional system. The bus 34 is connected also to an interface 35 for accommodating the memory card 20 or 20'.

At power up of the computer system 30, it is necessary to provide the start up password stored in the memory card 20 or 20' for use in logging in the system. The memory card 20 or 20' is inserted to a slot 31 to start the use of the computer system 30. The main processor unit 31 serves to read the start up password from the memory card 20 or 20' when rebooting. If the start up password is verified, the main processor unit 31 serves to start the operation of the computer system 30. The computer system 30 does not start otherwise.

Since the memory card 20 or 20' halts and resumes at random during the process of reading the start up password and therefore it becomes difficult to analyze the start up password.

Fifth Embodiment

Figure 6A:
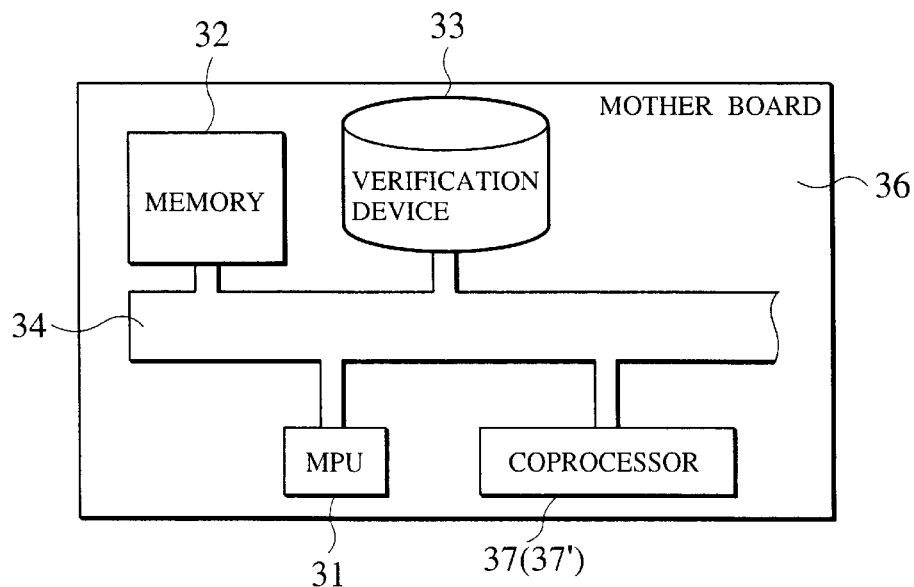
FIG. 6 is a view for explaining a computer system in accordance with a fifth embodiment of the present invention; in which (a) is a block diagram showing the mother-board; (b) is an expanded view of a coprocessor; and (c) is an expanded view of an exemplary modification of the coprocessor.

FIG. 6 is a view for explaining the fifth embodiment of the present invention. FIG. 6(a) is a block diagram showing the configuration of a mother board 36 of a computer.

The mother board 36 is designed in the same manner as that explained in conjunction with the fifth embodiment with some exceptions including the fact that a coprocessor 37 or 37' handling the signal processing necessary for encryption/decryption is mounted in place of the interface 35 for the memory card.

Figure 6B:
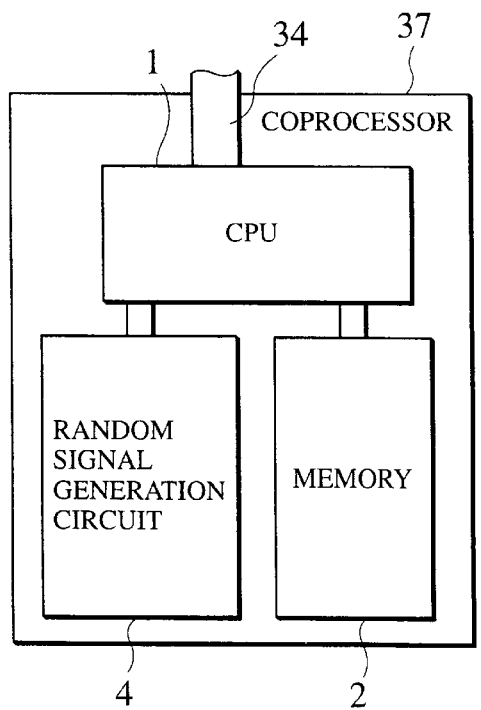

The coprocessor 37 for encryption/decryption is composed of a CPU 1 for executing instruction sequences for such as a routine of verification for decrypting encrypted data and the like, a memory 2 for storing key data for use in decrypting the encrypted data, a random signal generation circuit 4 for generating a wait signal 3 which is output in order to halt the operation of the CPU 1 as illustrated in FIG. 6(b) which is an expanded view. The CPU 1 is connected to the bus 34.

The CPU 1 is an integrated circuit for taking control of the entirety of the IC chip 12. When the wait signal 3 is input, the CPU 1 halts its operation for a short time such as one to several clocks.

The random signal generation circuit 4 is composed of an integrated circuit such as an semiconductor device in order to output the wait signal 3 in a non-periodic manner.

The coprocessor 37 for encryption/decryption can be replaced by a coprocessor 37' with a modification.

Figure 6C:
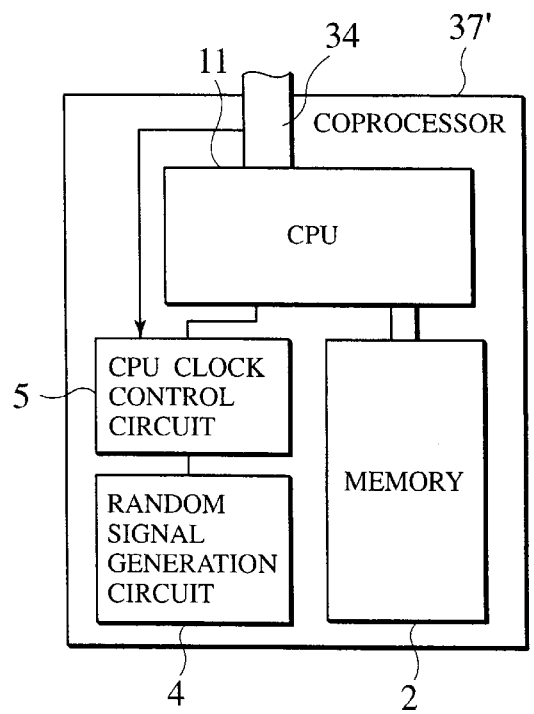

As illustrated in FIG. 6(c), the coprocessor 37 in accordance with the exemplary modification is composed of a CPU 11 for executing instruction sequences for such as a routine of verifying a password and the like, a memory 2 for storing data indicative of the key data for use decrypting the encrypted data, a CPU clock control circuit 5 for controlling the supply of clock signals to the CPU 11, a random signal generation circuit 4 for generating a random signal in order to control the operation of the CPU clock control circuit 5.

The CPU 11 is not provided with the halt function responsive to the wait signal unlike the CPU 1 as explained above. The CPU 11 is controllably operated with the CPU operating clock signal.

When the CPU 11 is suspended from being supplied with the CPU operating clock signal, the operation of the CPU 21 is halted with its internal operation state thereof being maintained as it is. When the CPU operating clock signal 6 is supplied again to the CPU 21, the CPU 11 resumes its operation from the internal operation state as maintained.

The CPU clock control circuit 5 serves to control the supply of the clock signal as input from the bus 34 to the CPU 11. The CPU clock control circuit 5 serves to intercept the clock signal to be supplied to the CPU 11 and transfer the clock signal to the CPU 11 as the CPU operating clock signal 6 under the control of the random signal from the random signal generation circuit 4.

The random signal generation circuit 4 serves to supply the wait signal 3 to the CPU clock control circuit 5 in a non-periodic manner. The random signal generation circuit 4 serves to make irregular the frequency of the CPU operating clock signal 6 as outputted from the CPU clock control circuit 5 by inputting the wait signal to the CPU clock control circuit 5 in a random timing.

Decrypting Process

Figure 7A:
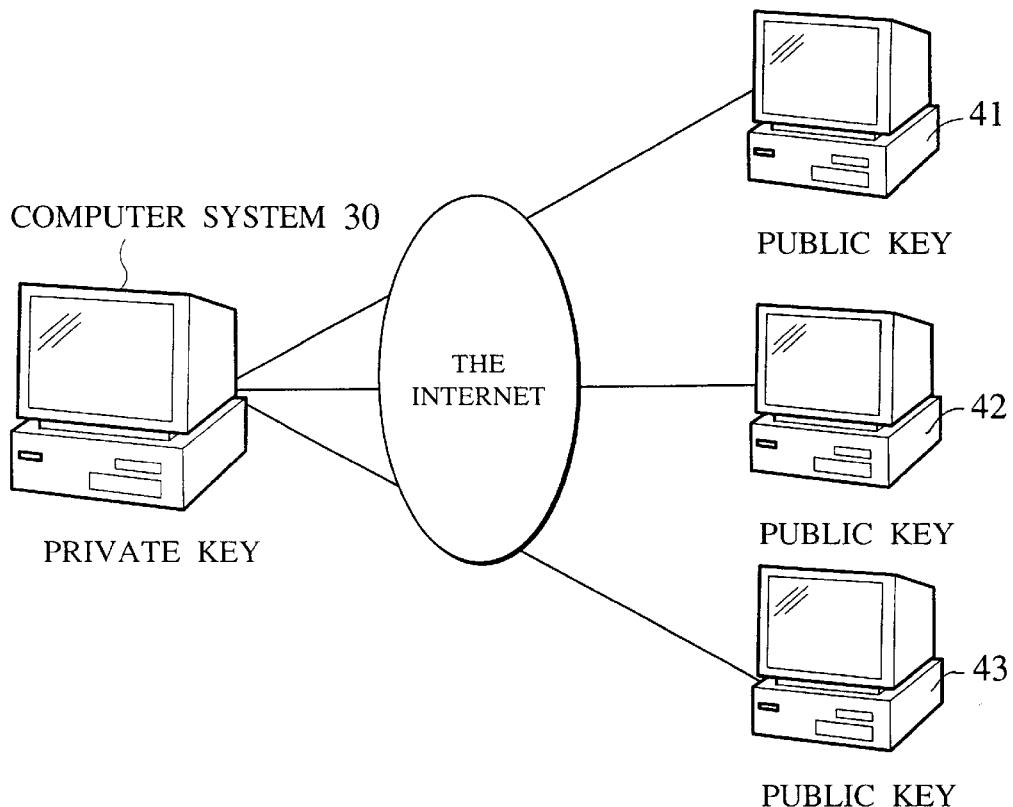
FIG. 7 a view for explaining the operation of the computer system in accordance with the fifth embodiment of the present invention for making a digital signature; in which (a) is a schematic diagram showing a digital signature scheme for use in the Internet; and (b) is a schematic diagram demonstrating the encryption of a digital signature.

FIG. 7 is a view for explaining the operation of the system in which a digital signature is made for use in the Internet.

As illustrated in FIG. 7, a computer system 30 which is used by a user possessing a private key is connected to a plurality of computer systems 41 to 43 which are used by users having the a public key.

Figure 7B:
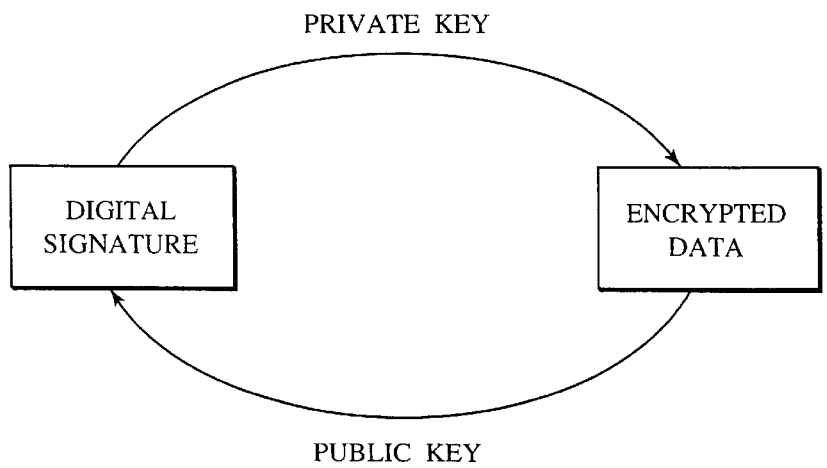

The digital signature is encrypted by the private key and decrypted by the public key as illustrated in FIG. 7(b). Since the private key is required to make the digital signature, only a user possessing the private key can make the digital signature.

When the user who made the digital signature sends a document with the digital signature from the computer system 30 through the Internet, a third person can decrypt the digital signature with the public key. The digital signature is encrypted by reading the private key stored in the coprocessor 37 or 37' for use in the encryption process to be conducted by the main processor unit 31.

When transferring the private key stored in the memory 1 or 11, the main processor unit 31 halts and resumes its operation at random in response to the wait signal. For this reason, for example, even if an unauthorized person tries to get the private key by analyzing the operation of the computer system 30, it is difficult to perform such an analysis so that the private key is effectively protected.

What is claimed is:

1. A security card provided with an IC chip comprising:
   a memory element configured to store secret data;
   a reading circuit configured to read said secret data as stored in said memory element;
   a connection terminal configured to receive an external signal;
   a connection configured to transmit an output signal; and
   a random signal generation circuit configured to transmit a wait signal to said reading circuit in response to said external signal in a non-periodic manner, wherein
     said reading circuit halts its reading operation in response to said wait signal in a non-periodic manner with the operation state being maintained in such a state as having been taken just before the reading circuit halts and, after resuming, the halted operation is continued from said operation state as maintained.

2. The security card as claimed in claim 1, wherein a length of time of the wait signal is a same length or shorter than a time for the reading circuit to read the secret data.

3. The security card as claimed in claim 1, wherein,
   said reading circuit is configured to receive a password from an external source, to match the password against secret data stored in a memory in order to verify whether or not the password is in agreement with the secret data, and to output a result of said verifying under the control of the wait signal.

4. A security card provided with an IC chip comprising:
   a memory element configured to store secret data;
   a reading circuit configured to read said secret data as stored in said memory element;
   a connection terminal configured to receive an external an clock signal;
   a connection terminal configured to transmit an output signal; and
   a clock signal control circuit configured to intercept said external clock signal to be supplied to said reading circuit and to transfer the external clock signal as an operating clock signal to said reading circuit in a non-periodic manner,
   wherein said reading circuit halts its reading operation while the supply of said operating clock signal is deferred with the operation state being maintained in such a state as having been taken just before the reading circuit halts and, after resuming, the halted operation is continued from said operation state as maintained.

5. The security card as claimed in claim 4, wherein a length of time of the wait signal is a same length or shorter than a time for the reading circuit to read the secret data.

6. The security card as claimed in claim 4, wherein,
   said reading circuit is configured to receive a password from an external source, to match the password against secret data stored in a memory in order to verify whether or not the password is in agreement with the secret data, and to output a result of said verifying under the control of the operating clock signal.

7. A security card provided with an IC chip comprising:
   a memory element configured to store secret data;
   a reading circuit configured to read said secret data as stored in said memory element;
   a connection terminal configured to receive an external signal;
   a connection terminal configured to transmit an output signal;
   a clock signal control circuit configured to intercept said external clock signal to be supplied to said reading circuit and tp transfer the external clock signal as an operating clock signal to said reading circuit in a non-periodic manner; and
   a random signal generation circuit configured to transmit a wait signal in a non-periodic manner; wherein,
     said clock signal control circuit is configured to defer said operating clock signal in a non-periodic manner in response to said wait signal input from said random signal generation circuit, and
     said reading circuit halts its reading operation while the supply of said operating clock signal is deferred with the operation state being maintained in such a state as having been taken just before the reading circuit halts and, after resuming, the halted operation is continued from said operation state as maintained.

8. The security card as claimed in claim 7, wherein a length of time of the wait signal is a same length or shorter than a time for the reading circuit to read the secret data.

9. The security card as claimed in claim 8, wherein,
   said reading circuit is configured to receive a password from an external source, to match the password against secret data stored in a memory in order to verify whether or not the password is in agreement with the secret data, and to output a result of said verifying under the control of the operating clock signal.

10. A computer system provided with an interface configured to read a security card, said security card comprising
    a memory element configured to store a start up password for booting said computer system;
    a reading circuit configured to read said start up password as stored in said memory element;
    a connection terminal configured to receive an external signal;
    a connection terminal configured to transmit an output signal; and
    a random signal generation circuit configured to transmit a wait signal to said reading circuit in response to said external signal in a non-periodic manner, wherein
      said reading circuit halts its reading operation in response to said wait signal in a non-periodic manner with the operation state being maintained in such a state as having been taken just before the reading circuit halts and, after resuming, the halted operation is continued from said operation state as maintained, and wherein if the start up password is valid, said computer system starts its operation.

11. The security card as claimed in claim 10, wherein a length of time of the wait signal is a same length or shorter than a time for the reading circuit to read the secret data.

12. The computer system as claimed in claim 10, wherein,
said reading circuit is configured to receive a password from said computer system and matches the password against secret data stored in said memory in order to verify whether or not the password is in agreement with the secret data under the control of the wait signal, and
if the start up password is valid, said computer system starts its operation.

13. A computer system provided with an interface configured to read a security card, said security card comprising:
a memory element configured to store a start up password for booting said computer system;
a reading circuit configured to read said start up password as stored in said memory element;
a connection terminal configured to receive an external clock signal;
a connection terminal configured to transmit an output signal; and
a clock signal control circuit configured to serve to intercept said external clock signal to be supplied to said reading circuit and to transfer the external clock signal as an operating clock signal to said reading circuit in a non-periodic manner, wherein,
said reading circuit halts its reading operation while the supply of said operating clock signal is deferred with the operation state being maintained in such a state as having been taken just before the reading circuit halts and, after resuming, the halted operation is continued from said operation state as maintained, and
if the start up password is valid, said computer system starts its operation.

14. The security card as claimed in claim 13, wherein a length of time of the wait signal is a same length or shorter than a time for the reading circuit to read the secret data.

15. The computer system as claimed in claim 13 wherein and to said reading circuit is configured to receive a password from said computer system and to match the password against secret data stored in said memory in order to verify whether or not the password is in agreement with the secret data under the control of said operating clock signal, and if the start up password is valid, said computer system starts its operation.

16. A computer system provided with an interface for reading a security card, said security card comprising:
a memory element configured to store a start up password for booting said computer system;
a reading circuit configured to read said start up password as stored in said memory element;
a connection terminal configured to receive an external signal;
a connection terminal configured to transmit an output signal;
a clock signal control circuit configured to intercept said external clock signal to be supplied to said reading circuit and to transfer the external clock signal as an operating clock signal to said reading circuit in a non-periodic manner; and
a random signal generation circuit configured to transmit a wait signal in a non-periodic manner; wherein,
said clock signal control circuit is configured to defer said operating clock signal in a non-periodic manner in response to said wait signal input from said random signal generation circuit,
said reading circuit halts its reading operation while the supply of said operating clock signal is deferred with the operation state being maintained in such a state as having been taken just before the reading circuit halts and, after resuming, the halted operation is continued from said operation state as maintained, and
if the start up password is valid, said computer system starts its operation.

17. The security card as claimed in claim 16, wherein a length of time of the wait signal is a same length or shorter than a time for the reading circuit to read the secret data.

18. The computer system as claimed in claim 16 wherein,
said reading circuit is configured to receive a password from said computer system and to match the password against secret data stored in said memory in order to verify whether or not the password is in agreement with the secret data under the control of said operating clock signal, and
if the start up password is valid, said computer system starts its operation.

* * * * *